United States Patent

Smernoff

[15] 3,640,687
[45] Feb. 8, 1972

[54] CHROMATOGRAPHY METHOD AND APPARATUS

[72] Inventor: Ronald B. Smernoff, Belmont, Calif.
[73] Assignee: Oxford Laboratories, San Mataeo, Calif.
[22] Filed: July 23, 1969
[21] Appl. No.: 844,116

[52] U.S. Cl. ............................................... 23/230 B, 424/1
[51] Int. Cl. .................................. G01n 31/04, G01n 33/16
[58] Field of Search ........................................ 23/230 B; 424/1

[56] References Cited

UNITED STATES PATENTS

| 3,389,968 | 6/1968 | Masen | 23/230 B |
| 3,414,383 | 12/1968 | Murphy | 23/230 B |

Primary Examiner—Morris O. Wolk
Assistant Examiner—R. M. Reese
Attorney—Limbach & Limbach

[57] ABSTRACT

A chromatographic method and apparatus for serum thyroxine iodine determination including sealed ion exchanged resin column structures which are opened and press fit and sealed to funnel members for use and a method in which serum protein is removed from resin bound thyroxine in alkaline solution, with a pH of substantially 8.

10 Claims, 6 Drawing Figures

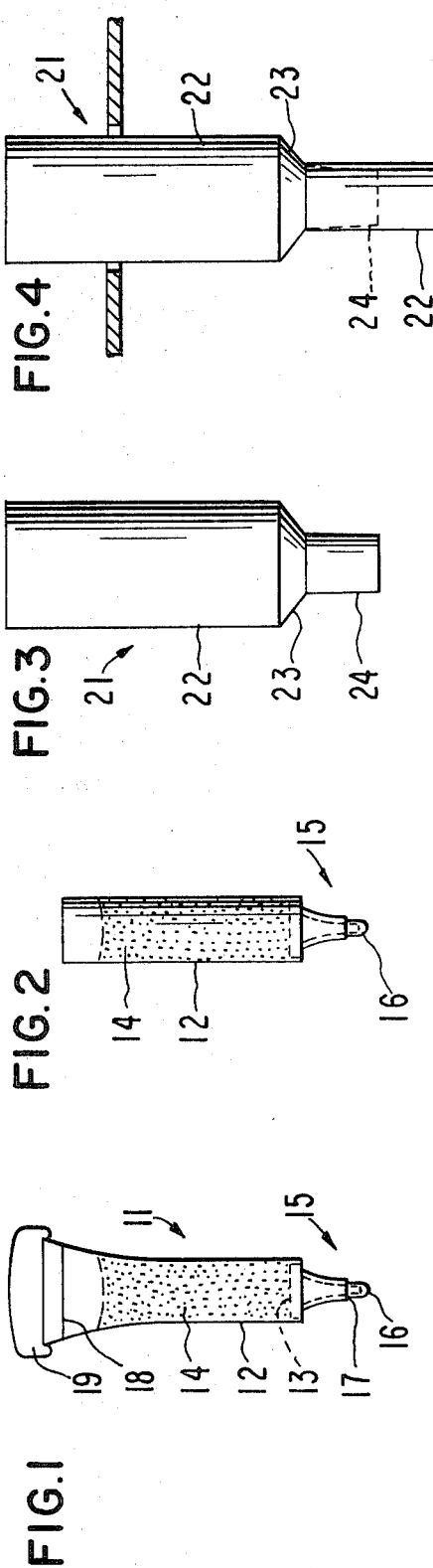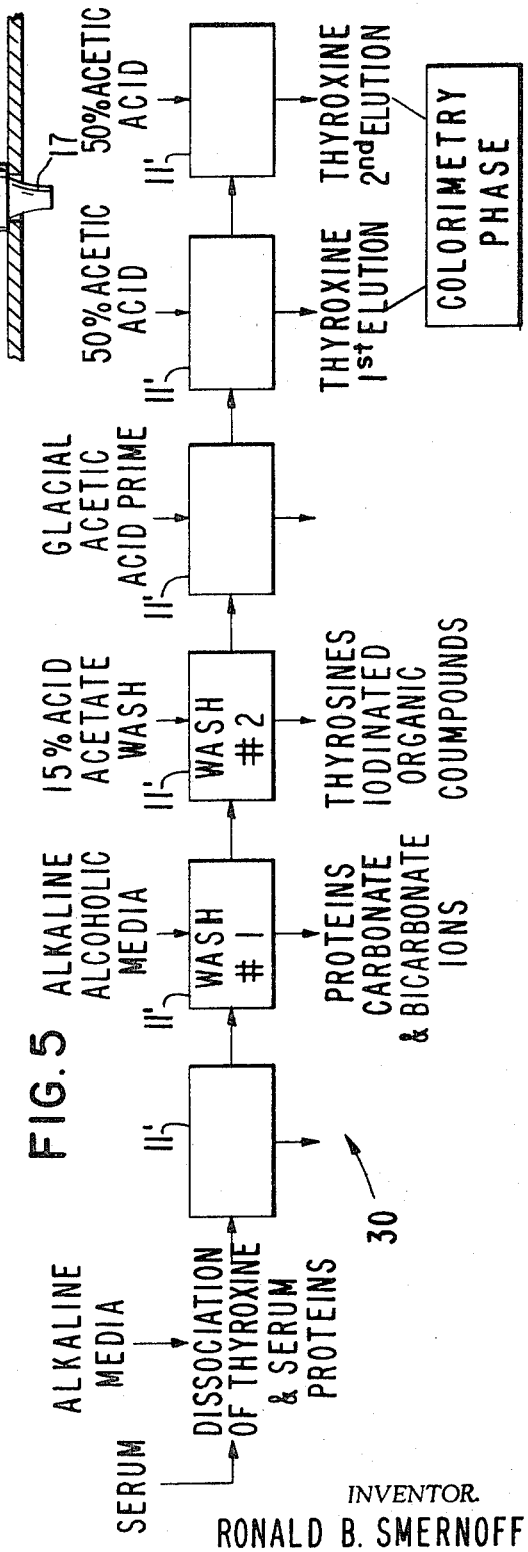

CHROMATOGRAPHY METHOD AND APPARATUS

The present invention relates in general to liquid chromatography method and apparatus and more particularly to method and apparatus for determining serum thyroxine iodine level.

It is possible to make an accurate measure of thyroid activity by a determination of serum thyroxine iodine level. Iodine is bound by the thyroid gland into thyroxine, and thyroxine is the principal active thyroid secretion, representing about 90 percent of the total thyroid hormone. Thyroxine circulates bound to certain serum protein and under normal conditions, without the presence of interferring substances, the protein-bound iodine determination is a measure of serum thyroxine level.

The determination of protein-bound iodine and thyroxine is the determination of submicrogram quantities of material and determinations of this kind are frequently troubled by interfering substances. Both circulating iodine and organic iodine compounds will interfere with the protein-bound iodine determinations. Since many radiographic media are iodinated compounds, these media, when present, will give false evaluations, and the length of time for which these media can interfere ranges from a few days to many years. When inorganic compounds are present in less than gross amounts, they may be removed by either pretreatment of the serum with an appropriate ion-exchange resin or by precipitation of the protein, but neither of these techniques are trouble-free.

Butanol extraction of serum results in a determination of thyroxine freed of inorganic iodine interference. However, the unwanted iodine compounds are extracted with the thyroxine. Unfortunately, the protein-bound iodine determination and the butanol extraction determination do not distinguish between contaminated and uncontaminated specimens.

Relatively recently a selective method of measuring serum thyroxine in the presence of iodinated contamination has received widespread acceptance. This method is the determination of serum thyroxine iodine by ion-exchange resin column chromatography. The serum sample is chromatographed onto an appropriate ion-exchange resin. Thyroxine is bound to the resin while serum protein and unwanted iodinated compounds are washed from the resin. Serum thyroxine is then selectively washed from the resin with a known volume of 50 percent acetic acid. This thyroxine solution in acetic acid is then analyzed for iodine by standard techniques, either manual or automated. A cold-acid bromination technique circumvents furnace or hot-acid digestion and this technique may be performed safely with the most modern equipment.

The existing ion-exchange column chromatograph techniques typically utilize three or four or more washes of the thyroxine bound to the resin for removal of unwanted compounds. The greater the number of washes, the greater the time required to run the determination and the cost of the reagents for the determination.

Chromatographic column test structures and solutions are sold for serum thyroxine iodine determination by ion-exchange resin column chromatography. These structures typically include a combined funnel and column structure for containing the resin to be used with the test and for feeding treating solutions to the column. The structures include separate part cap structures to close the column, and one structure includes a member projecting from the removable cover into the column to close off a portion of the column for confining the resin therein. These structures do not seal well and consequently often leak allowing the resin to detrimentally dry out and require refrigeration of the column until use. Additionally, with the enlarged surface area of the combined column and funnel, the resin becomes distributed on numerous surfaces, and all the resin is not always returned to the operating portion the of column when the column is opened and drained for use. Since it is desired to have a constant known volume or resin, this distribution of the resin over the various surfaces out of the operating column portion can result in an inaccurate test determination.

The object of the present invention is to provide a simple inexpensive method and apparatus for serum thyroxine iodine determination by ion exchange resin column chromatography which provides a fast and accurate determination of thyroxine level.

Broadly stated, the present invention to be described in greater detail below is directed to method and apparatus for thyroxine iodine determination utilizing a liquid chromatography column structure comprising a column element having a tubular barrel portion and a tipped portion at one end of the barrel portion molded closed for opening by cutting the end of the tip, a slurry of the ion-exchange resin in the barrel and a pinched, heat seal at the end of the barrel opposite the tipped portion, hermetically sealing the column, thereby preventing contamination and the requirement for refrigeration.

In accordance with the aspect of the present invention, the ion-exchange resin is packaged in a structure having minimum excess surface area outside the actual column region for collection of resin that would prevent an accurate determination when the test is performed.

The opening structure also includes a funnel member having a tapered neck portion sealably insertable in the barrel portion of the column element inwardly of the hermetic seal portion so that for operation of the column the heat-sealed end of the column can be cut off and the neck portion of the funnel press fitted into the open end of the column thereby establishing a seal between the funnel and the column so that appropriate solutions can be added to the column without spillage.

In accordance with another aspect of the present invention, the serum thyroxine dissociated from thyroid binding proteins in an alkaline diluent and bound to the ion-exchange resin for separation of the serum proteins is washed with an alkaline solution to remove serum proteins from the thyroxine. It has been discovered that most efficient removal of proteins from the column is achieved utilizing an alkaline wash having a pH of at least about 8. Solutions with lower pH permit protein to remain the column which can subsequently end up in the desired eluate unless an excessive number of subsequent washes are utilized. It has also been found that by increasing the pH of the alkaline was above 8, additional substantial benefits are not obtained.

Additionally, the alkaline wash includes an alcohol constituent to remove carbonate and bicarbonate ions. Carbonate and bicarbonate ions are stable in alkaline solution and are removed by the alcohol, typically isopropyl alcohol, thereby preventing evolved $CO_2$ gas from disrupting the column when acid is subsequently added.

These and other features and advantages will become more apparent upon a perusal of the following specification taken in conjunction with the accompanying drawings wherein similar characters of reference refer to similar structures in each of the several views.

FIG. 1 is a elevational view showing the construction of a column element in accordance with the present invention sealed for shipment and storage.

FIG. 2 is a view similar to FIG. 1 with the sealed end of the column removed for assembly with a funnel member.

FIG. 3 is a elevational view of a funnel member for use with the column element.

FIG. 4 is an elevational view of an assembled column and funnel with the column opened and drained ready for use.

FIG. 5 is a block diagram view schematically illustrating the steps performed in the ion-exchange resin column chromatography method in accordance with this invention.

Figure 6:
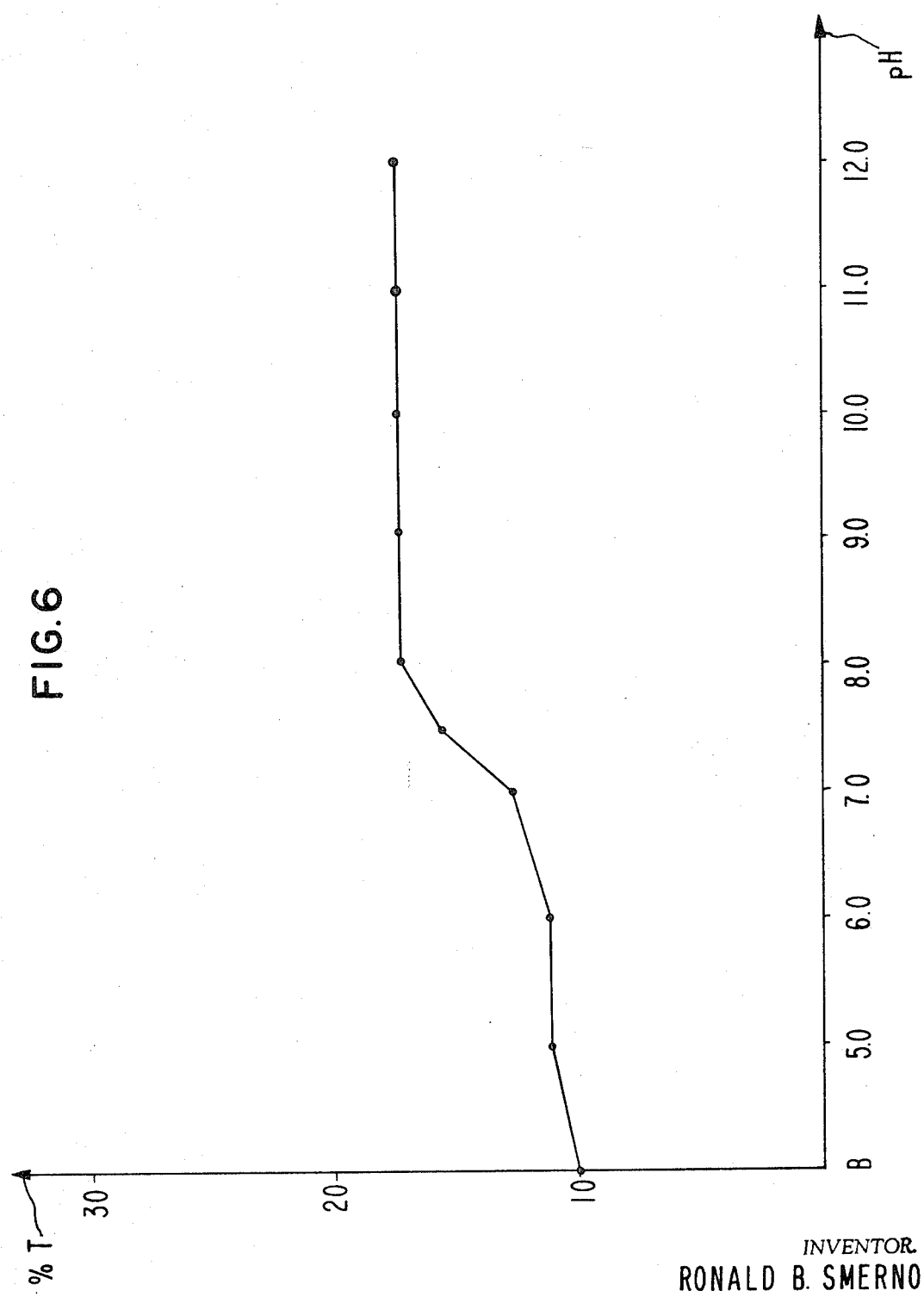
FIG. 6 is a graph of percent transmittance plotted versus pH for 11 samples showing the effect of increasing pH of the first column wash upon the recovery of thyroxine iodine.

While the present invention can be applied to separation of other materials by ion-exchange resin column chromatography, such as separation of plasma steroids, it is particularly and principally adapted for the quantitative determination of serum thyroxine iodine and will be described with respect to such a method.

Referring now to the drawing, with particular reference to FIG. 1, there is shown a filled and sealed liquid chromatography column 11 ready for storage and use. The column 11, such as molded of polyethylene, is provided with a tubular barrel portion 12 adapted to contain the ion-exchange resin above a porous filter 13, such as of porous polyethylene. A anionic or cationic exchange resin is placed in the column. Typical anionic exchange resins are polystyrene with a divinyl benzene crosslinkage, strongly basic with a crosslinkage of about 2 percent. A suitable resin of this type is sold by Dow Chemical Co. under the trademark DOWEX-1 X2. Other suitable resins include the resins sold under the trademarks DOWEX-1 X4, −1 X8, −2 X4, −2 X8 and 21K by Dow Chemical Co., AMBERLITE IRA 400 and 401 by Rohm & Haas Co, ANIONIT AU 17 by the Soviet Union, DEACIDITE FF by Permutite Co., England DUOLITE A 101 by Chemical Process Co., U.S., and PERMUTITE ESD by Permutite Co., Inc., Germany.

The resin is typically packaged as a slurry 14 in acetic acid until desired for use. One end of the barrel 12 below the filter 13 is provided with an integrally molded tip portion 15 molded with a sealed tip end 16 but with an outside diameter graduation 17 reducing in diameter toward the tip end 16. The tip end 16 is adapted to be cut off at the diameter reduction 17 for opening the lower end of the column to drain the solution from the resin for use of the column.

The other or upper end of the barrel 12 above the level of the acetic acid-resin slurry 14 is provided with a marker line 18 and spaced therefrom a seal 19 established by pinching the top of the column together along a line with applied heat. The marker line 18 is located at the selected length and diameter of the column to provide a press fit seal with the lower end of a funnel member 21 to be combined with the column, after the element 11 is opened and ready for use.

FIG. 2 shows a column with the upper end cut off at the marker line 18 to remove the seal and prepare the column for combination with a column funnel 21.

As shown in FIG. 3, the column funnel 21, such as of polypropylene or high-density polyethylene, which will not weld to the polyethylene column element 11, includes a tubular barrel portion 22 and at the bottom thereof a reducing diameter portion 23 which is in turn connected to a tapered neck portion 24 for insertion into the top of column element 11 as shown in FIG. 4.

In order to utilize the column element 11, as shown in FIG. 4, the funnel member 21 is press fit into the opened top end of the column element barrel 12 thereby creating a seal between the two members, and the tip end 16 of the column element is cut off allowing the acetic acid solution to drain from the ion exchange resin so that the resin 25 is ready for use.

With the separation of the column and funnel in accordance with the present invention, the column element can be packaged and shipped separately ready for use without distributing resin over large surface areas. The resin is contained in the column portion where it is to be used. The column structures are disposable while the funnel members can be reused after simple washing in alkaline detergent, rinsing with distilled or deionized water and air drying. By forming the funnel member 21 of a material more rigid than the material of the column 11, a deformed or stretched portion of column 11 is established when the two members are pressed together thereby establishing a good fluid tight seal.

Referring now to FIG. 5, there is shown a flow diagram illustrating the method in accordance with the present invention. As illustrated there, the thyroxine of a serum sample is isolated from other serum components in a chromatography phase 30, and then in a colorimetry phase the thyroxine iodine is liberated from the thyroxine molecule and measured such as with arsenious acid and ceric ammonium sulphate. Generally, in the chromatography phase 30, the serum thyroxine is dissociated from thyroid binding proteins and the serum thyroxine bound to an anionic resin in the chromatograph column 11 where it is retained while the proteins and other constituents are washed therefrom in two washes before movement of the thyroxine down and out of the column in separate elutions.

In the chromatography phase, the thyroxine is most effectively dissociated from serum protein in an alkaline media, with pH at least 11.0. This can be accomplished in a serum diluent such as 0.1 normal sodium hydroxide solution with resulting pH of approximately The diluted serum is allowed to stand for a period of time during which the column can be prepared in the form illustrated in FIG. 4.

At the end of the standing period, the diluted serum is poured through the funnel 21 into the column 11 and as the mixture passes through the column, thyroxine and related compounds, serum proteins and serum iodide are trapped in the ion-exchange resin within the column. The balance of the fluid passes through the column to waste.

Next, undesired constituents are washed from the column while the thyroxine is retained. In the first of two washes, the column is washed with an alkaline-alcoholic solution adjusted to a pH of 8.0. It has been discovered that separation of the serum proteins from the thyroxine iodine in the column is increased as the alkalinity of the wash is increased up to a pH of approximately 8. As the pH of the wash is increased above 8, the separation is not effectively increased further. The alkaline solution completely removes the serum proteins from the column.

The alkaline wash used for wash No. 1 in FIG. 5 contains an alcohol such as methanol, ethanol, propanol, isopropanol, butanol, or benzyl alcohol which will dissolve carbonates and bicarbonates and a basic material by which the pH of the wash is raised to at least 8.0. Suitable basic materials include inorganic hydroxides such as sodium hydroxide, potassium hydroxide, and ammonium hydroxide, low molecular weight primary and secondary amines such as ethyl amine and diethyl amine and the salts thereof, the salts of weak acids such as phosphates or citrates and sodium propionate, sodium formate and the like. Basic materials which contain iodine should not be used, and preferably, the basic material should contain no carbonate or bicarbonate groups.

Graph FIG. 6 shows the effective separation of a standard thyroxine sample in the column from dissociated protein for a range of alkaline solutions from a pH of 5 up to a pH of 12 and showing percentage transmission in a colorimetry determination, with a bland "B" containing no thyroxines but with each of the other example points determined upon aliquots of the same serum. The actual level of thyroxine iodine in the serum was determined to be 2.4 micrograms per 100 ml. It will be apparent from FIG. 6 that by utilizing a wash of at least pH 8 and of substantially pH 8 it is possible to come as close to the acid pH level ultimately described and still obtain the effect of the alkaline wash for dissociation of the thyroxine from serum proteins.

In the alkaline column wash, carbonate and bicarbonate ions present are stable in the alkaline solution. An alcohol is added to this first wash as a solvent to remove the carbonate and bicarbonate ions. This removal prevents the evolution of $CO_2$ gas from disrupting the column when acid is subsequently added. Isopropanol is the most solvating alcohol for carbonate ions and is conveniently added to the alkaline wash. Alternatively, other alcohols, such as methanol, can be utilized.

After the alkaline-alcoholic wash has passed through the column, then an acid acetate wash, such as 15 percent acetic acid solution, is passed therethrough to remove iodothyronine and most of the color iodinated organic compounds.

After the acid acetate wash, a small amount of glacial acetic acid is added to the column increasing the concentration of acid in the column up to 40 percent or more so that thyroxine moves down the column and weak acid escapes from the bottom of the column. All column effluents to this point are passed to waste.

Next, with the column positioned to collect the effluent in a clean receptacle, a quantity of acetic acid is added to the column so that the thyroxine and the small amount of triiodothyronine, normally present in the serum, are selectively eluted from the column. After this first solution has passed through the column, the column is repositioned over a second clean receptacle and this last step performed again to collect a second elution.

Ninety-four percent of the serum thyroxine is present in the first elution. The balance is found in the second elution. Certain iodinated organic compounds when present will also be found in the second elution. Inorganic iodine will be retained in the column. The values resulting from the two elutions are used conjunctively to determine whether or not an individual sample is contaminated.

The thyroxine solution in acetic acid is then analyzed for iodine by standard colorimetric techniques either manual or automated which do not form a part of this invention. Such techniques are described by D. L. Bittner et al. Thyroxine Round Table, American Society of Clinical Pathologists, Miami, Oct., 1968, Pileggi et al., Clinical Chemistry, Vol. 14, p. 339, 1968 and Pileggi et al., Journal of Clinical Endocrinology Metabolism, Vol. 21, p. 1,272, 1961.

While the description above is believed sufficient to enable a person skilled in the art to practice the invention, the following is given for additional information. By way of a specific example, thyroxine iodine determination was accomplished on an accurately repeatable basis by first diluting 1 ml. of serum with 5 ml. an alkaline serum diluent —0.1 normal sodium hydroxide solution. These solutions were mixed well and allowed to stand at room temperature for 15 minutes which permitted complete dissociation of serum thyroxine from the thyroid-binding proteins. The 15-minute time was found necessary to permit complete dissociation. This mixture was then added to a previously prepared ion-exchange resin column.

In the preparation for a packaged ion exchange resin column the resin, such as Dowex-1, X-2, analytical grade, was prepared for the chromatograph column by making the commercially received resin into a wet slurry in deionized water. The, one pound of carbonate was added to the slurry for every 10 pounds of resin and the carbonated slurry allowed to stand overnight. The slurry was collected onto a filter and washed in five percolated washes with deionized water on an equal volume basis with the slurry. The resin was then returned to the tank and slurried with one-half of its volume of deionized water. To the slurry glacial acetic acid was added and stirred until the pH was 2 or less. The resin was then sized between 100 and 120 wet mesh and diluted in a pH 3 acetic acid solution 50/50 by volume. Two milliliters of this slurry were delivered to each of the columns 11 and heat sealed therein.

The size of the resin column was selected to permit subsequent washes with 10 milliliters of wash solution. For this purpose the column element selected was 0.36–0.37 inches in diameter and a length 2 inches including approximately 178 inch allowed for the seal. The column element tip had an inside diameter of approximately 0.0625 inch and a tip length of 0.550 inch to the point of cutoff.

For the funnel 21 the barrel portion 22 had an inside diameter of 0.85 inch and a length of 2.10 inches for receiving the 10-milliliter washes and the funnel tip 24 was sized with a gradual taper from slightly less than 0.36 inch to substantially greater whereby a fluid-type seal was created between the neck portion 24 of the funnel 21 and the barrel portion 12 of the column element 11.

The column elements were prepared by first resuspending the contents of the column by shaking and allowing the resin contents to drain toward the bottom tip of the column. Trapped bubbles were dislodged by tapping on the side of the column element. The column was then cut along the marker line 18 near the top. The funnel 21 was inserted into the open end of the column element, and the two members were pressed together whereby a fluid seal was created therebetween. The tip end 16 of the column 11 was cut off squarely against the shoulder 17, and the column assembly was inserted into a column rack and fluid drained therefrom to waste.

Next, the diluted serum was delivered to the column and the column effluent discarded. Ten milliliters of alkaline acetate wash made up of a pH 8.0 sodium acetate in 50 percent isopropanol were added to the column for a first wash. Then, 10 milliliters of 15 percent acetic acid solution were added to the column as a second wash and 0.65 milliliter of glacial acetic acid were added.

After all column flow stopped, a first elution was collected from 3 milliliters 50 percent acetic acid solution added to the column, and then a second elution was collected from another 3 milliliters of 50 percent acetic acid solution added to the column.

A colorimetry determination was made by first adding 0.50 milliliter of 4.0 normal sulfuric acid and 0.50 milliliter dilute alkaline solution of KBr and $KBrO_3$ to each elution, mixing and storing for between 10 and 30 minutes. Then to each elute 1 milliliter of $As_2O_3$ in dilute sulfuric acid solution was mixed and the tubes placed in a waterbath at 37° C. and equilibrated for 5 minutes. Next 1 milliliter of ceric ammonium sulfate in dilute sulfuric acid was mixed into the other mixture and allowed to incubate for 20 minutes. A spectrophotometer was set at 100 percent T against deionized or distilled water at 420 millimicrons, and when the tube of incubated solution was placed in the spectrophotometer, the wavelength setting was changed to adjust the reading to 10 percent T and a reading taken.

What is claimed is:

1. A method for determining serum thyroxine level comprising:
    dissociation of serum thyroxine from thyroid binding proteins in an alkaline solution, binding the thyroxine to an ion-exchange resin,
    washing the thyroxine binding resin with an alkaline-alcoholic solution and
    subsequently selectively washing the thyroxine from the resin for colorimetry measurement of thyroxine levels.

2. The method of claim 1 wherein said washing step includes washing with a solution having a pH level of at least about 8.

3. The method of claim 2 wherein said washing is accomplished by an alkaline solution removing serum proteins in solvent removing carbonate and bicarbonate ions.

4. The method of claim 1 wherein said washing step includes washing with a solution having a pH of substantially 8.

5. The method of claim 4 wherein said washing is accomplished by an alkaline solution removing serum proteins in solvent removing carbonate and bicarbonate ions.

6. A method for determining serum thyroxine levels comprising:
    dissociation of serum thyroxine from thyroid binding proteins,
    binding thyroxine in an ion-exchange resin, removing serum protein and carbonate and bicarbonate ions from resin bound thyroxine in an alkaline-alcoholic solution,
    are removing thyroxine from the binding resin for colorimetry measurement of thyroxine levels.

7. The method of claim 6 wherein serum protein is removed from resin bound thyroxine by an alkaline acetate solution with pH at least about 8.

8. In an ion-exchange column chromatographic determination for serum thyroxine iodine wherein the serum thyroxine is dissociated from thyroid-binding proteins in an alkaline diluent, thyroxine bound to an ion-exchange resin for separation from the serum proteins and from which the thyroxine is subsequently removed for colorimetry measurement of thyroxine levels the improvement comprising washing the resin bound thyroxine with an alkaline-alcoholic acetate solution to remove serum proteins from thyroxine.

9. In the method of claim 8 washing with a solution having a pH of at least about 8.

10. In the method of claim 8 washing with a solution having a pH of substantially 8.

* * * * *